United States Patent
Sinnhuber

(10) Patent No.: US 6,402,191 B1
(45) Date of Patent: Jun. 11, 2002

(54) INFLATABLE AIR BAG SYSTEM WHICH SERVES AS A PROTECTIVE WALL IN FRONT OF A VEHICLE SIDEWALL

(75) Inventor: Ruprecht Sinnhuber, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/700,882

(22) PCT Filed: May 3, 1999

(86) PCT No.: PCT/EP99/02991

§ 371 (c)(1),
(2), (4) Date: Nov. 20, 2000

(87) PCT Pub. No.: WO99/59845

PCT Pub. Date: Nov. 25, 1999

(30) Foreign Application Priority Data

May 18, 1998 (DE) .......................... 198 22 227

(51) Int. Cl.[7] .......................... B60R 21/22; B60R 21/24
(52) U.S. Cl. .......................... 280/729; 280/730.2
(58) Field of Search .......................... 280/729, 730.2, 280/743.1, 730.1, 740, 742

(56) References Cited

U.S. PATENT DOCUMENTS

| 3,731,949 A | | 5/1973 | Radke |
| 4,290,627 A | * | 9/1981 | Cumming et al. .......... 280/729 |
| 5,660,414 A | | 8/1997 | Karlow et al. |
| 5,884,937 A | | 3/1999 | Yamada |
| 6,042,141 A | * | 3/2000 | Welch et al. ............ 280/729 |

FOREIGN PATENT DOCUMENTS

| DE | 43 07 175 | 9/1993 |
| DE | 42 31 522 | 3/1994 |
| DE | 43 37 656 | 5/1995 |
| DE | 19 519 297 | 12/1995 |
| DE | 296 10 920 | 8/1996 |
| DE | 196 45 031 A1 | 5/1997 |
| DE | 196 47 679 A1 | 6/1997 |
| EP | 08 47 904 | 6/1998 |
| WO | WO 96/26087 | 8/1996 |

* cited by examiner

Primary Examiner—Peter C. English
(74) Attorney, Agent, or Firm—Cohen, Pontani, Lieberman & Pavane

(57) ABSTRACT

The invention relates to an inflatable air bag system (10) which serves as a protective wall in front of a vehicle sidewall (1). Said air bag system comprises a plurality of restraint cushions which can be inflated by a gas generator (12). According to the invention, at least one of the restraint cushions is configured as a gas distributor cushion (11) which is the first to be impinged upon by a gas mass flow from the gas generator (2). Said restraint cushion is at least partially covered in the restraint position of one of the vertical pillars, preferably a B-pillar (7). The gas distributor pillow (11) comprises discharge openings through which the portions of the gas mass flow can be delivered, optionally via filling channels (20 to 23), from the gas generator (12) to additional restraint cushions (24, 25). Such an arrangement permits the gas distributor cushion (11) to rapidly cover an assigned vertical column (7) and permits the connected restraint cushions (24, 25) to fill rapidly. The gas mass flows can be controlled in a selective manner according to conditions during the inflation process by varying the dimensions of the filling channels (20 to 23) and by optionally using valves (33; 40).

16 Claims, 2 Drawing Sheets

INFLATABLE AIR BAG SYSTEM WHICH SERVES AS A PROTECTIVE WALL IN FRONT OF A VEHICLE SIDEWALL

BACKGROUND OF THE INVENTION

1. Field of the Invention

The invention relates to an air-bag device which can be inflated as a protective wall in front of a vehicle side wall.

2. Discussion of the Prior Art

A known air-bag device of the generic type (DE 296 10 920 U1; WO 96/26087) can be inflated as a protective wall in front of a vehicle side wall having vertical pillars. For this purpose, the air-bag device includes a gas generator having fillable restraint cushions which, in the folded-up inoperative state, are concealed under a paneling part of a lateral roof longitudinal member. In the event of a side impact, the gas generator is activated by means of an impact sensor. The restraint cushions are filled by means of a gas mass flow and moved into a restraint position in which they cover the upper region of the side window of the vehicle wall. In this arrangement, the restraint cushions are connected to one another to form a restraint mat which remains secured essentially along its entire longitudinal extent in the region of the lateral roof longitudinal member. The filling procedure of the restraint cushions takes place via a filling pipe in the form of a metal pipe having outlet openings offset over the length. The filling pipe likewise extends along the entire longitudinal extent in the region of the lateral roof longitudinal member and is connected to the gas generator. Filling pipes of this type as gas lances made of metal or plastic have the disadvantage of a relatively large overall volume and heavy weight.

A protective wall of this type is used in particular as a side airbag for the head in order to dampen a head impact of an occupant in the event of a side impact and/or overturning. The intention is furthermore thereby to prevent particles, for example of destroyed side windows, paneling parts etc., from flying into the occupants compartment.

On account of the occupants head not being very far from vehicle side parts, it is precisely inside air-bag devices that very rapid inflating procedures of the restraint cushions are required in order to still bring the latter in front of the vehicle side parts before a head impact. In spite of the high filling speeds achieved up to now, further improvements are desirable here. One problem of the air-bag devices resides generally in the aggressiveness shown with respect to occupants, which can occur, in particular if an occupant is "out of position" (OOP).

In a similar known air-bag device (DE 196 47 679 A1) a mat consisting of pneumatically connected beads is inflated as the protective wall in such a manner that a gas generator is connected at one location on the mat and a gas mass flow is blown in. A filling pipe in the form of a gas lance inserted into the mat is not provided here. Because the filling takes place only via one location without additional filling or unfolding aids, the filling procedure may be relatively slow with the mat only having a slightly defined position in the restraint position.

Furthermore, a side impact protection device for vehicle occupants is known (DE 196 45 031 A1) in which in the event of a side impact an unfoldable protective curtain is merely pulled from above over the region of the vehicle window. For this purpose, a vertical rail guide is provided in which a projectile connected to a side corner of the protective curtain can be moved downwards with the aid of a gas generator. This protective curtain does not contain any inflatable restraint cushions and so the protective effect is relatively mall as compared with air-bag devices.

SUMMARY OF THE INVENTION

The object df the invention is to provide an air-bag device which has a very rapid inflating procedure with good occupant protection and low aggressiveness, in particular when "out of position".

According to the present invention at least one of the restraint cushions is designed as a distributor cushion which is the first of the plurality of restraint cushions to be subjected to a gas mass flow from the gas generator. In the restraint position the distributor cushion at least partially covers an assigned vertical pillar. In addition, the distributor cushion has discharge openings through which portions of the gas mass flow from the gas generator can be supplied to the other restraint cushions, optionally via filling channels. The restraint cushions can be designed as air-bag chambers of an air bag of single- or multi-part design.

By means of the design of a distributor cushion which is the first to be subjected to a gas mass flow from the gas generator and which is inflated in front of a vertical pillar, there is advantageously already effective impact protection with respect to a vertical pillar shortly after the inflating procedure has begun. Only a relatively small gas mass flow is required in order to inflate the distributor cushion and thus the distributor cushion can be inflated very rapidly. No aggressiveness with respect to a vehicle occupant is to be expected from the inflating procedure of the distributor cushion in the region of the vertical pillar. Since the distributor cushion is inflated very rapidly and the inflating procedure for the other restraint cushions takes place via a plurality of discharge openings of the distributor cushion, suitable dimensioning of the discharge openings with respect to the arrangement and the diameter can also result in a very rapid inflation of the protective wall for the entire air-bag device. In conjunction with the dimensioning of the discharge openings and of the filling channels, specific influencing of the time sequence and of the inflating volume of the other restraint cushions is possible, which makes possible adaptation to vehicle-specific and individual conditions.

For a specific distribution of the gas mass flow, the distributor cushion may also consist of chambers or gas channels. Furthermore, the filling procedure and/or the service lives of the restraint cushions may, depending on the requirements, optionally be influenced by panels and/or gas diverters and/or nonreturn valves.

In the event of a vehicle overturning, both air-bag devices on both sides of the vehicle are expediently triggered. In addition, use can be made of stepped generators which are known per se and with which gas can subsequently be blown into the restraint cushions in order to extend the service life and/or in the event of a multiple collision.

As a stable part, the gas generator is to be arranged outside a potential head-impact region of front and rear occupants of the vehicle, preferably in a lateral roof strut in the vicinity of the B-pillar. Depending on the specific conditions, an arrangement of the gas generator in the vertical pillars, in the boot or in the engine compartment may also be expedient.

To give specific and rapid filling of the restraint cushions, it is proposed to connect at least one filling channel which is connected to the restraint cushions to the discharge openings of the gas distributor cushion.

In a particularly advantageous arrangement, in the restraint position the gas distributor cushion covers the B-pillar, it then being possible, depending on the embodiment in each case, to provide at least one inflatable filling channel in the direction of an A-pillar and/or at least one inflatable filling channel in the direction of a C-pillar and/or D-pillar. By this means, in conjunction with a rapid inflating procedure, extensive covering of a possible head-impact region on the vehicle side wall can be carried out.

In the restraint position an upper filing channel is to be provided in a fixed position in the region of a lateral roof longitudinal member and a lower filling channel is to lie somewhat above the window parapet. A simple and rapidly fillable arrangement is achieved if the upper filling channel and the lower filling channel are connected at their ends to form an annular channel, and the restraint cushions can be filled in their position on the respective annular-channel region by the annular channel through corresponding discharge openings. The restraint cushions are then expediently rapidly inflated from the roof lining and/or from the window parapet by corresponding lower and upper filling channels via the annular channel.

In order to protect front and rear occupants, starting from a gas distributor cushion in the region of the B-pillar, front and rear filling-channel and annular-channel arrangements having assigned restraint cushions are used. During inflation of the gas distributor cushion the lower filling channels and lower regions of the annular channels are then moved downwards in the direction of the window parapet. In a preferred embodiment, the restraint cushions are then filled both from above and from below via the upper and lower filling channels and parts of the annular channels.

As a result of the restraint cushions (when the restraint cushions have not yet been inflated or are only partially inflated, as a result of their fabric material), right at the beginning of the inflating phase, a curtain is extended from the roof lining or the roof paneling as deflection protection, for example against broken glass in the event of overturning.

With appropriate dimensioning of the size ratios of the components, in particular of cross-sectional ratios of the filling channels and/or discharge openings, time sequences during the inflating procedure of the restraint cushions can be influenced and predetermined. For this purpose, the at least one filling channel or annular-channel section which is assigned to the A-pillar advantageously has a larger cross section than the at least one filling channel or annular-channel section assigned to the C- and/or D-pillar. This has the effect that the front restraint cushions for the front occupants are filled more rapidly than the restraint cushions for the rear occupants, since the rear seats for rear occupants are, in statistical terms, only infrequently occupied.

In an advantageous further embodiments, it is proposed for the distributor cushion and/or the filling channels to be assigned a valve arrangement which can be used to control individual or groups of discharge openings with respect to the gas mass flow. In this arrangement, the valves can be controlled electrically or pneumatically. However, valve control preferably takes place automatically by means of the gas mass flow, optionally in conjunction with gas mass counterflows.

With appropriate valve controls, at the beginning of the inflating procedure the main gas mass flow, for example, can then be directed into the restraint cushions for the front occupants. If, using means which are known per se, it is recognized that a seat is occupied, an appropriately controlled valve in the distributor cushion, for example when rear seats are not occupied, can deflect the gas mass flow only to the restraint cushions for the front occupants and the restraint cushions for the rear occupants are not filled.

In principle, the protective wall is unfolded during the inflating procedure by the gas mass flow directed into the distributor cushion, the filling channels and the restraint cushions. In order to accelerate the unfolding and positioning of the distributor cushion, use can additionally be made of a drive assembly which is connected to the distributor cushion via a tensile element. In this arrangement, use can advantageously be made, in a manner known per se, of a pyrotechnically operated pretensioning device, optionally in conjunction with a seat-belt pretensioning device. As the tensile element, a cable requiring little installation space can be integrated in a side paneling, for example on the rear side of a pillar. With an arrangement of this type, the unfolding of the protective wall can advantageously be accelerated and an opening fright for an affected occupant as well as loading in an "out of position" case can be reduced.

The elements of the air-bag device can be integrated all together or partially in paneling parts or a roof inside lining and/or can be preassembled thereon, as a result of which favorable installation costs in the case of a small installation space are obtained. In this arrangement, the gas channels are produced from the cushion fabric, which enables a reduction on installation space and weight as compared with known gas lances made of steel or plastic. Valve arrangements also advantageously contribute to this because of the sewn-in valve flaps.

BRIEF DESCRIPTION OF THE DRAWINGS

The invention is explained in greater detail with reference to a drawing, in which.

DETAILED DESCRIPTION OF THE PREFERRED EMBODIMENTS

Figure 1:
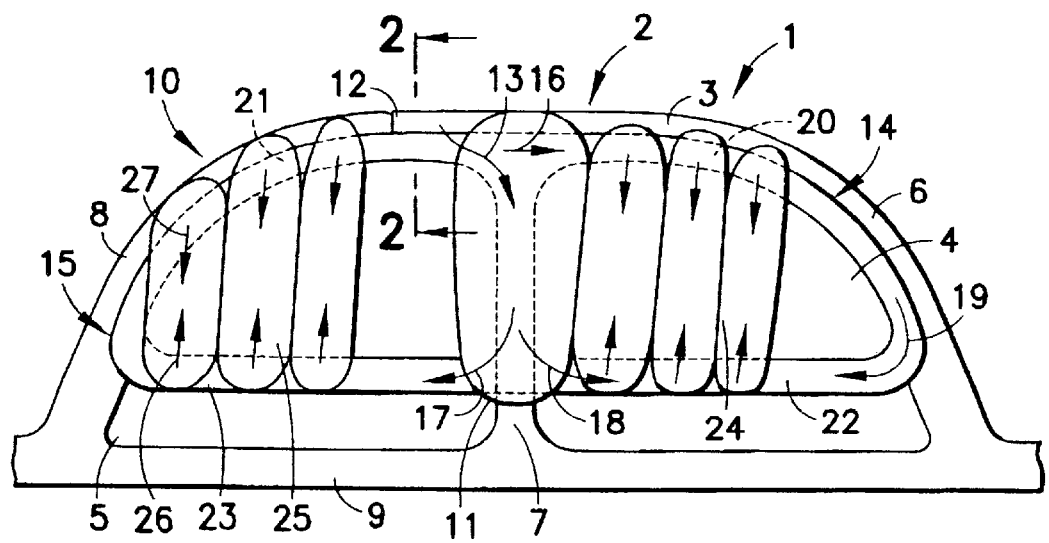
FIG. 1 shows a side view of the inside of a vehicle side wall having an inflated air-bag device as the protective wall.

In FIG. 1, the inner view of part of a vehicle side wall 1 is illustrated schematically, having a lateral roof longitudinal member 2 which is covered with respect to the occupants compartment by means of a paneling part, having a front side window 4, having a rear side window 5, having an A-pillar 6, a B-pillar 7 and a C-pillar 8, and having a lower window parapet 9.

As part of an air-bag device 10, a gas distributor cushion 11 is inflated and positioned in front of the B-pillar 7, the cushions 11 being filled via a gas generator 12 arranged in the lateral roof longitudinal member 2. A corresponding gas mass flow is indicated by the flow arrow 13.

Portions of the gas mass flow are fed via discharge openings and/or gas channels (not illustrated in detail) of the gas distributor cushion 11 to a front annular channel 14 and a rear annular channel 15, which channels are each connected by an end region to the upper and lower lateral ends of the gas distributor cushion 11. The filling of the annular channels 14, 15 is illustrated schematically by the flow arrows 16, 17, 18 and 19.

The annular channels 14, 15 in conjunction with the gas distributor cushion 11 lie somewhat in front of the assigned frame parts of the front and rear side window 4, 5. For this purpose, the front and rear annular channels 14, 15 consist in each case of a front, upper filling channel 20 and a rear, upper filling channel 21 and also of a front, lower filling channel 22 and a rear, lower filling channel 23. The lower and upper annular channel parts each are connected to one another annularly to form the annular channels 14, 15. The front and rear lower filling channels 22, 23 are at a distance from the window parapet 9 arranged below them.

Arranged in the region of the annular channels 14, 15, and preferably in front of them in the direction of the occupants compartment, are front restraint cushions 24 and rear restraint cushions 25 for front occupants and rear occupants. In the specific exemplary embodiment three of the restraint cushions are drawn lying next to one another and connected to form a mattress.

The front and rear restraint cushions 24, 25 are connected via discharge openings to the assigned upper and lower filling channels 20 to 23 and are inflated both from below and from above corresponding to the marked flow arrows 26, 27.

Figure 2:
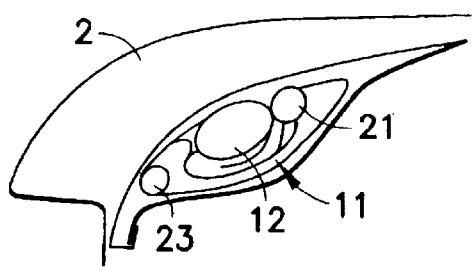
FIG. 2 shows a cross section in the region of a lateral roof longitudinal member along the line 2—2 in FIG. 1 of a first embodiment.
Figure 3:
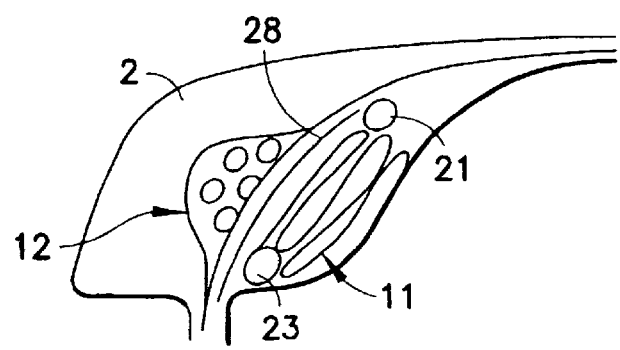
FIG. 3 shows a cross section corresponding to FIG. 2 of a second embodiment.

In FIGS. 2 and 3, alternative embodiments of an air-bag arrangement (not yet unfolded) are in each case illustrated in a cross section 2—2 through the lateral roof longitudinal member 2 in the region of the gas generator 12.

FIG. 2 illustrates a gas generator 12 between a roof longitudinal member 2 and an inner paneling part 3, the gas generator 12 being oval in cross section for good use of space and is connected to the gas distributor cushion 11 (which can be seen as the folded textile fabric) which in turn is connected to the upper filling channel 21 and the lower filling channel 23. This arrangement is advantageously designed as a module and together with the paneling part 3 forms an installation unit.

In a similar, alternative embodiment according to FIG. 3 the gas generator 12 is integrated in conjunction with a diffuser 28 in the roof longitudinal member 2.

Figure 6:
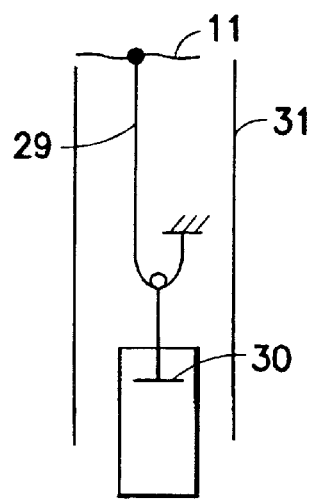
FIG. 6 shows a schematic illustration of a pyrotechnic pretensioning device for assisting the unfolding of a distributor cushion according to FIG. 1.

The arrangement according to FIGS. 1 to 3 has the following function: in the event of a relevant side impact the gas distributor cushion 11 in the region of the B-pillar 7 is first of all inflated by the gas generator 12 from the top downwards, as a result of which this region is rapidly covered. The unfolding of the gas distributor cushion 11 can be further accelerated by means of an additional device, as is illustrated schematically in FIG. 6. In this case, the gas distributor cushion 11 is connected via a cable 29 to a drive assembly in the form of a pyrotechnically driveable piston 30, the pyrotechnic propellant being ignited together with the gas generator 12 or optionally offset in time with respect thereto. In a multiple function, the pyrotechnically driven piston 30 can also be part of a seat-belt pretensioning device. This arrangement can be accommodated in a paneling part 31 of the B-pillar 7.

During inflation of the gas distributor cushion 11 the lower filling channels 22, 23 are moved downwards in the direction of the window parapet 9 and the front and rear restraint cushions 24, 25 are inflated via the upper and lower filling channels 20 to 23. In the inflating phase of the front and rear restraint cushions 24, 25, even in a not yet completely inflated state, a protective curtain is formed which is then further inflated to form the protective wall with filled restraint cushions 24, 25.

Figure 4:
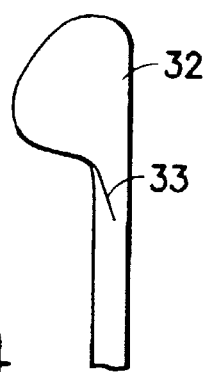
FIG. 4 shows a cross section through a gas channel of the air-bag device from FIG. 1 with a sewn-in valve.

Valves are used for a specific control and deflecting of the gas mass flows in the gas distributor cushion 11, the annular channels 14, 15 and the restraint cushions 24, 25. An arrangement of this type is illustrated schematically in FIG. 4, where a tab is sewn into one of the gas channels 32 produced from textile fabric as a valve 33 in a gas passage. A valve 33 of this type can be actuated by the gas mass flow and by gas mass counterflows without an additional valve drive.

Figure 5:
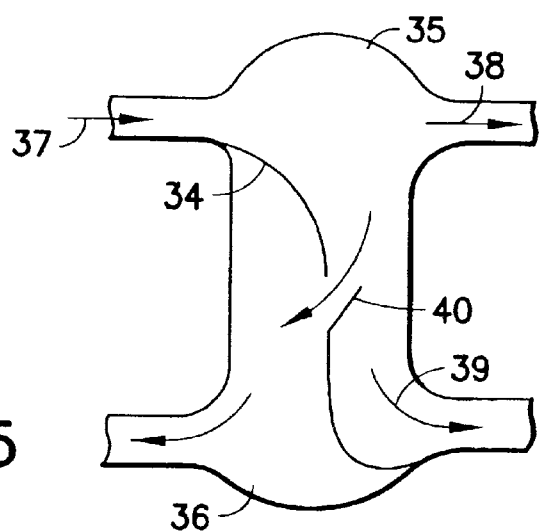
FIG. 5 shows a vertical longitudinal section through an alternative embodiment of a distributor cushion corresponding to FIG. 1.

In FIG. 5, an alternative embodiment of a gas distributor cushion 11 is illustrated having an intermediate wall 34 and a valve 40 which can, for example, be activated electrically. The intermediate wall 34 provides a first gas distributor chamber 35 and a second gas distributor chamber 36. The first gas distributor chamber 35 is connected to the gas generator 12 (flow arrow 37) and to the front, upper and front, lower filling channels 20, 22 (flow arrows 38, 39). If a seat-occupation recognition means (not illustrated) establishes that the associated rear seats are not occupied in the event of a side impact, the valve 40 is closed, so that only the front restraint cushions 24 are filled rapidly. In contrast, if it is established that the associated rear seats are also occupied, the valve 40 is opened, so that the restraint cushions 25 which are connected to the second gas distributor chamber 36 via the filling channels 21, 23 are also filled.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An air-bag device which can be inflated as a protective wall in front of a vehicle side wall having vertical pillars, the air-bag device comprising: a plurality of air-bag chambers; and a gas generator operatively connected to the chambers so as to fill the chambers as a plurality of restraint cushions, the air-bag chambers being foldable in an inoperative state and movable from the inoperative state into a restraint position in which at least parts of the vehicle side wall are covered, at least one of the restraint cushions being configured as a gas distributor cushion which is a first of the plurality of restraint cushions to be subjected to a gas mass flow from the gas generator, the gas distributor cushion being configured to at least partially cover one of the vertical pillars in the restraint position, the gas distributor cushion having discharge openings through which portions of the gas mass flow from the gas generator can be supplied to the other of the restraint cushions, in the restraint position at least one upper filling channel is provided in a fixed position in a region of a lateral vehicle roof longitudinal member and at least one lower filling channel lies above a vehicle window parapet, the filling channels being connected to the discharge openings for filling the other restraint cushions.

2. An air-bag device according to claim 1, wherein the gas generator is arranged outside head-impact regions of front and rear occupants of the vehicle.

3. An air-bag device according to claim 1, wherein the filling channels, in the restraint position, having a contour which at least matches lower side edges of the cushions.

4. An air-bag device according to claim 3, wherein the vertical pillar which is covered by the gas distributor cushion is a B-pillar, the filling channels including a channel which can be inflated in a direction of an A-pillar.

5. An air-bag device according to claim 4, wherein at least one filling channel is provided which is inflatable toward at least one of a C-pillar and a D-pillar of the vehicle.

6. An air-bag device according to claim 5, wherein the filling channel assigned to the A-pillar has a larger cross-section than the filling channel assigned to at least one of the C-pillar and the D-pillar.

7. An air-bag device according to claim 1, wherein the upper filling channel and the lower filling channel each emerge from the gas distributor cushion and are connected to form an annular channel.

8. An air-bag device according to claim 7, wherein at least one of the other restraint cushions is arranged within an annular-channel region so as to be fillable from a respectively assigned annular channel.

9. An air-bag device according to claim 1, wherein at least one of the restraint cushions is inflatable by gas flowing in a direction away from the window parapet.

10. An air-bag device according to claim 1, and further comprising a roof lining, at least one of the restraint cushions being fillable by gas flowing in a direction away from the roof lining.

11. An air-bag device according to claim 1, and further comprising a valve arrangement operatively assigned to at least one of the gas distributor cushion and the filling channels so as to control one of individual and groups of discharge openings with respect to the gas mass flow.

12. An air-bag device according to claim 11, wherein the valve arrangement has valves sewn into at least one of the gas distributor cushion, the restraint cushions and the filling channels so that the valves are actuable by the gas mass flow.

13. An air-bag device according to claim 1, and further comprising a drive assembly and a tensile element arranged to connect the drive assembly to the gas distributor cushion so as to assist unfolding of the protective wall.

14. An air-bag device according to claim 13, wherein the drive assembly is a pyrotechnically drivable piston.

15. An air-bag device according to claim 13, wherein the tensile element is a cable.

16. An air-bag device according to claim 13, and further comprising a paneling part, at least one of the drive assembly, the tensile element and the gas distributor cushion being pre-assembled on the paneling part.

\* \* \* \* \*